(12) United States Patent
Choi et al.

(10) Patent No.: US 10,530,610 B2
(45) Date of Patent: Jan. 7, 2020

(54) METHOD AND APPARATUS FOR ESTIMATING CHANNEL IN MULTIPLE-INPUT MULTIPLE-OUTPUT COMMUNICATION SYSTEMS EXPLOITING TEMPORAL CORRELATIONS

(71) Applicant: POSTECH ACADEMY-INDUSTRY FOUNDATION, Pohang-si (KR)

(72) Inventors: Junil Choi, Pohang-si (KR); Hwanjin Kim, Pohang-si (KR)

(73) Assignee: POSTECH ACADEMY-INDUSTRY FOUNDATION, Pohang-si (KR)

(*) Notice: Subject to any disclaimer, the term of this patent is extended or adjusted under 35 U.S.C. 154(b) by 0 days.

(21) Appl. No.: 16/194,066

(22) Filed: Nov. 16, 2018

(65) Prior Publication Data

US 2019/0207785 A1 Jul. 4, 2019

(30) Foreign Application Priority Data

Jan. 3, 2018 (KR) .................. 10-2018-0000504

(51) Int. Cl.
*H04B 3/46* (2015.01)
*H04L 25/02* (2006.01)
(52) U.S. Cl.
CPC .......... *H04L 25/024* (2013.01); *H04L 25/021* (2013.01); *H04L 25/0204* (2013.01); *H04L 25/025* (2013.01)
(58) Field of Classification Search
CPC . H04L 25/024; H04L 25/0204; H04L 25/025; H04L 25/021
See application file for complete search history.

(56) References Cited

U.S. PATENT DOCUMENTS

| | | | |
|---|---|---|---|
| 2013/0064315 A1* | 3/2013 | Heath, Jr. | ............... C23C 14/04 375/260 |
| 2016/0105230 A1* | 4/2016 | Sidiropoulos | ........ H04B 7/0639 375/267 |

FOREIGN PATENT DOCUMENTS

| | | | | |
|---|---|---|---|---|
| KR | 10-2008-0101014 | | 11/2008 | |
| KR | 10-2011-0092930 | | 8/2011 | |
| WO | WO-2017000752 A1 * | | 1/2017 | ............ H04L 25/02 |

OTHER PUBLICATIONS

Li et al., "Channel Estimation and Performance Analysis of One-Bit Massive MIMO Systems," IEEE Transactions on Signal Processing, 2017, vol. 65, Issue 15, 14 pages.

Lee et al., "5G Massive MIMO," The Magazine of the IEIE, 2015, vol. 42, No. 10, pp. 16-34, including English language translation of abstract.

* cited by examiner

*Primary Examiner* — Dhaval V Patel
(74) *Attorney, Agent, or Firm* — Morgan, Lewis & Bockius LLP

(57) ABSTRACT

A channel estimation method in multiple-input multiple-output (MIMO) communication systems using a temporal correlation and an apparatus therefor are provided. The method includes quantizing a receive signal received via each of MIMO antennas using an analog-to-digital converter (ADC) and reflecting a temporal correlation in the quantized receive signal and estimating a channel for the receive signal, received via each of the MIMO antennas, based on the receive signal in which the temporal correlation is reflected.

8 Claims, 6 Drawing Sheets

METHOD AND APPARATUS FOR ESTIMATING CHANNEL IN MULTIPLE-INPUT MULTIPLE-OUTPUT COMMUNICATION SYSTEMS EXPLOITING TEMPORAL CORRELATIONS

CROSS-REFERENCE TO RELATED APPLICATIONS

This application claims priority under 35 U.S.C. § 119 to Korean Patent Application No. 10-2018-0000504 filed on Jan. 3, 2018, in the Korean Intellectual Property Office, the disclosures of which are incorporated by reference herein in their entireties.

BACKGROUND

Embodiments of the inventive concept described herein relate to technologies of estimating channels in multiple-input multiple-output (MIMO) systems, and more particularly, relate to a channel estimation method for enhancing estimation accuracy for uplink channel estimation using a temporal correlation in MIMO systems which perform one-bit quantization.

A future communication system is expected to use a millimeter wave band to employ a very large wideband on the basis of a massive MIMO system with a transceiver in which a plurality of antennas are installed. When a base station (BS) knows the entire channel information, using large-scale antennas in the BS may reduce inter-user interference by simple linear processing and increase reliability by the channel hardening effect.

Massive MIMO may suffer from high implementation cost and power consumption by using a large number of radio frequency (RF) chains. It is possible to resolve these issues by using one-bit analog-to-digital converters (ADCs) or low-resolution ADCs since the ADC power consumption exponentially increases with its resolution level. Thus, the massive MIMO system using low-resolution ADCs or one-bit ADCs may greatly decrease in implementation cost and total power consumption.

Successful symbol detection, however, requires accurate channel state information at the BS. Because low-resolution ADCs heavily quantize received signals, the channel estimation becomes an extremely difficult task. There has been some recent work to tackle this problem. A near maximum likelihood channel estimator based on convex optimization was proposed, and a joint channel and data estimator were developed. Furthermore, to reduce the channel estimation complexity, the generalized approximate message passing algorithm was exploited, while the hybrid architectures was considered for channel estimation.

All the previous work, however, has not considered the temporal correlation, which is inherent in all communication channels.

Thus, one embodiment of the inventive concept proposes a new channel estimation technique which exploits the temporal correlation of channels in the massive MIMO system exploiting one-bit ADCs.

SUMMARY

Embodiments of the inventive concept provide a channel estimation method for enhancing estimation accuracy for uplink channel estimation using a temporal correlation in a MIMO system which performs one-bit quantization and an apparatus therefor.

Embodiments of the inventive concept provide a channel estimation method for reflecting spatial and temporal correlations and enhancing estimation accuracy for channel estimation by performing Bussgang decomposition of a receive signal in which one-bit quantization is performed, replacing a non-linear function to a statistically equivalent linear function, and replacing quantization noise to statistically equivalent Gaussian noise to use a Kalman filter and an apparatus therefor.

According to an exemplary embodiment, a channel estimation method may include quantizing a receive signal received via each of multiple-input multiple-output (MIMO) antennas using an analog-to-digital converter (ADC) and reflecting a temporal correlation in the quantized receive signal and estimating a channel for the receive signal, received via each of the MIMO antennas, based on the receive signal in which the temporal correlation is reflected.

The estimating may include additionally reflecting a spatial correlation in the quantized receive signal and estimating the channel for the receive signal, received via each of the MIMO antennas, based on the receive signal in which the spatial correlation and the temporal correlation are reflected.

The estimating may include estimating the channel for the receive signal received via each of the MIMO antennas by performing Bussgang decomposition of the quantized receive signal and performing Kalman filtering of the receive signal in which the Bussgang decomposition is performed.

The estimating may include performing the Bussgang decomposition of the quantized receive signal and replacing a non-linear function included in the quantized receive signal to a linear function.

The estimating may include replacing noise, included in the receive signal in which the Bussgang decomposition is performed, to Gaussian noise to perform the Kalman filtering of the receive signal in which the Bussgang decomposition is performed.

The quantizing may include performing one-bit quantization of the receive signal using a one-bit ADC.

According to an exemplary embodiment, a channel estimation apparatus may include a quantization unit configured to quantize a receive signal received via each of multiple-input multiple-output (MIMO) antennas using an ADC and an estimation unit configured to reflect a temporal correlation in the quantized receive signal and estimate a channel for the receive signal, received via each of the MIMO antennas, based on the receive signal in which the temporal correlation is reflected.

The estimation unit may be configured to additionally reflect a spatial correlation in the quantized receive signal and estimate the channel for the receive signal, received via each of the MIMO antennas, based on the receive signal in which the spatial correlation and the temporal correlation are reflected.

The estimation unit may be configured to estimate the channel for the receive signal received via each of the MIMO antennas by performing Bussgang decomposition of the quantized receive signal and performing Kalman filtering of the receive signal in which the Bussgang decomposition is performed.

The estimation unit may be configured to perform the Bussgang decomposition of the quantized receive signal and replace a non-linear function included in the quantized receive signal to a linear function.

The estimation unit may be configured to replace noise, included in the receive signal in which the Bussgang decomposition is performed, to Gaussian noise to perform the Kalman filtering of the receive signal in which the Bussgang decomposition is performed.

The quantization unit may be configured to perform one-bit quantization of the receive signal using a one-bit ADC.

According to an exemplary embodiment, a channel estimation apparatus may include MIMO antennas, an ADC unit configured to quantize a receive signal received via each of the MIMO antennas to a predetermined bit, and a baseband processing unit configured to reflect a temporal correlation in the quantized receive signal and estimate a channel for the receive signal, received via each of the MIMO antennas, based on the receive signal in which the temporal correlation is reflected.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
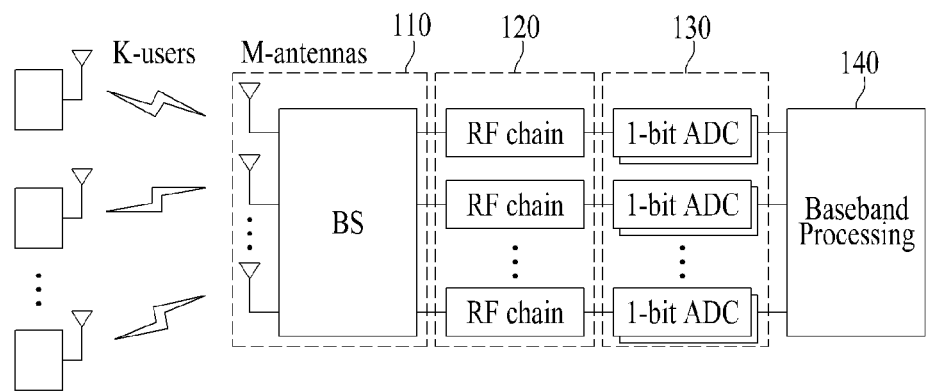
FIG. 1 is a block diagram illustrating a configuration of an embodiment for a massive MIMO system.

Hereinafter, a description will be given in detail of embodiments with reference to the accompanying drawings. However, the inventive concept is restricted or limited to embodiments of the inventive concept. Further, like reference numerals shown in each drawing indicates like members.

Embodiments of the inventive concept may be the gist of providing a channel estimation technique exploiting the temporal correlation of channels in a MIMO system using one-bit analog-to-digital converters (ADCs). The quantized receive signal with one-bit ADCs may result in information loss and may be difficult to be processed using a non-linear one-bit quantization function. An embodiment of the inventive concept may address such problems by replacing a non-linear quantizer to a linear operator by the Bussgang decomposition and replacing the statistically equivalent quantization noise to the Gaussian noise with the same mean and covariance matrix.

Moreover, an embodiment of the inventive concept may adopt the Kalman filter to exploit the temporal correlation and perform successive channel estimation after the Bussgang decomposition.

A description will be given of notation used in an embodiment of the inventive concept.

Lower and upper boldface letters represent column vectors and matrices, respectively. $A^T$, $A^*$, and $A^H$ denote the transpose, conjugate, and conjugate transpose of the matrix A, respectively. $E\{\cdot\}$ denotes the expectation and $\text{Re}\{\cdot\}$ and $\text{Im}\{\cdot\}$ denote the real part and imaginary part of the variable, respectively. $0_m$ denotes the m×1 zero vector, and $I_m$ denotes the m×m identity matrix. $\otimes$ denotes the Kronecker product. $\text{diag}(\cdot)$ returns the diagonal matrix. $C^{m \times n}$ and $R^{m \times n}$ represent m×n complex and real matrices, respectively. $|\cdot|$ denotes amplitude of the scalar and $\|\cdot\|$ denotes the $\ell_2$-norm of the vector. $CN(m, \sigma^2)$ denotes the complex normal distribution with mean m and variance $\sigma^2$.

FIG. 1 is a block diagram illustrating a configuration of an embodiment for a massive MIMO system using one-bit ADCs and illustrates a configuration of a system with M receive antennas, in which a signal (receive signal) of each of the receive antennas is received via radio frequency (RF) chains and one-bit ADCs.

As shown in FIG. 1, the massive MIMO system may include MIMO antennas 110, RF chains 120, one-bit ADCs 130, and a baseband processing unit 140.

The MIMO antennas 110 may receive a signal from the air and may provide the signal to the RF chains 120. Output signals of the RF chains 120 may be quantized via the one-bit ADCs 130.

Herein, the RF chains 120 may be formed of various devices. Such RF chains 120 are technical components capable of being known by those skilled in the art, so a detailed description thereof will be omitted.

The one-bit ADCs 130 may compare levels of signals output via the RF chains 120, that is, receive signals, with a predetermined threshold and may output a quantization value, for example, a value of +1 or −1.

Herein, the one-bit ADCs 130 may include one-bit ADCs for performing one-bit quantization of real parts of output signals of the RF chains 120 and one-bit ADCs for performing one-bit quantization of imaginary parts of the output signals of the RF chains 120.

The baseband processing unit 140 may reflect a temporal correlation in the one-bit quantized receive signals output via the one-bit ADCs 130 and may estimate a channel for a receive signals received via each of the MIMO antennas 110 based on the receive signals in which the temporal correlation is reflected.

Herein, the baseband processing unit 140 may be a component means for estimating a channel of a receive signal through a channel estimation algorithm according to an embodiment of the inventive concept. A detailed description therefor will be given with reference to FIGS. 2 to 6.

A description will be given in detail of a method and apparatus in such a massive MIMO system according to an embodiment of the inventive concept with reference to FIGS. 2 to 6.

System Model

Referring to FIG. 1, describing a channel model assumed in an embodiment of the inventive concept, as shown in FIG. 1, the embodiment of the inventive concept considers M base station (BS) antennas, that is, MIMO antennas and K users, each of which has a single antenna, and assumes the block-fading channel has a coherence time of T. At the i-th padding block, a receive signal at the BS may be given by Equation 1 below.

$$y_i = \sqrt{\rho} H_i s_i + n_i \qquad [\text{Equation 1}]$$

Herein, $\rho$ denotes the transmit SNR, $H_i=[h_{i,1}, h_{i,2}, \ldots, h_{i,K}]$ denotes the M×K channel, $h_{i,k}$ denotes the channel between the k-th user and the BS in i-th fading block, $s_i$ denotes the transmitted signal, and $n_i \sim CN(0_M, I_M)$ denotes the noise.

To model the spatially and temporally correlated channels, an embodiment of the inventive concept may assume $h_{i,k}$ follows the first-order Gauss-Markov process and may be represented as Equation 2 below.

$$h_{0,k} = R_k^{\frac{1}{2}} g_{0,k},$$
$$h_{i,k} = \eta_k h_{i-1,k} + \sqrt{1-\eta_k^2}\, g_{i,k} \quad i \geq 1$$
[Equation 2]

Herein, $R_k = E\{h_{i,k} h_{i,k}^H\}$ denotes the spatial correlation matrix, $0 \leq \eta_k \leq 1$ denotes the temporal correlation coefficient, and $g_{i,k} \sim CN(0_M, I_M)$ denotes the innovation process.

The quantized signal with the one-bit ADCs 130 may be represented as Equation 3 below.

$$r_i = Q(y_i) = Q(\sqrt{\rho} H_i s_i + n_i)$$
[Equation 3]

Herein, $Q(\cdot)$ denotes the one-bit quantization function as $$Q(\cdot) = \frac{1}{\sqrt{2}}(\text{sign}(\text{Re}\{\cdot\}) + j\,\text{sign}(\text{Im}\{\cdot\})).$$

Channel Estimation Using One-Bit ADCs

Prior to describing an embodiment of the inventive concept, a description will be given of the conventional approach of signal-shot channel estimation without exploiting the temporal correlation of channels. Then, a description will be given of a successive channel estimation technique for massive MIMO system using one-bit ADCs exploiting the temporal correlation according to an embodiment of the inventive concept.

Single-Shot Channel Estimator

An embodiment of the inventive concept may drop the time slot index i since signal-shot channel estimation does not exploit any temporal correlation. For a BS to estimate a channel, K users may simultaneously transmit their pilot sequences of $\tau$ symbols to the BS. A receive signal received from the BS may be represented as Equation 4 below.

$$Y = \sqrt{\rho} H \Phi^T + N$$
[Equation 4]

Herein, $Y \in C^{M \times \tau}$ denotes the receive signal, $\rho$ denotes the pilot transmit power, $H=[h_1, h_2, \ldots, h_K]$ is the M×K channel, $\Phi \in C^{\tau \times K}$ denotes the pilot matrix, and $N \sim CN(0, I_M)$ denotes the Gaussian noise.

An embodiment of the inventive concept assumes that all pilot sequences are column-wise orthogonal, that is, $\Phi^T \Phi^* = \tau I_M$. For simplicity, an embodiment of the inventive concept may vectorize the receive signal as Equation 5 below.

$$\text{vec}(Y) = \underline{y} = \overline{\Phi}\underline{h} + \underline{n}$$
[Equation 5]

Herein, $\overline{\Phi} = (\Phi \otimes \sqrt{\rho} I_M)$, $\underline{n} = \text{vec}(N)$, and $\underline{h} = \text{vec}(H)$. The correlation matrix $\underline{R} = E\{\underline{h}\underline{h}^H\}$ may be written as Equation 6 below.

$$\underline{R} = \begin{bmatrix} R_1 & \Lambda & 0 & 0 \\ M & R_2 & \Lambda & 0 \\ 0 & M & O & M \\ 0 & 0 & \Lambda & R_K \end{bmatrix}$$
[Equation 6]

It is assumed that each user experiences an independent spatial correlation. The quantized signal with one-bit ADCs may be represented as Equation 7 below.

$$r = Q(y)$$
[Equation 7]

The previous channel estimators with one-bit ADCs have high complexity due to the non-linear quantization of the one-bit ADCs. The simple, effective method is to use the Bussgang decomposition. A channel estimator according to an embodiment of the inventive concept may use the Bussgang decomposition proposed in existing research (Y. Li, C. Tao, G. Seco-Granados, A. Mezghani, A. L. Swindlehurst and L. Liu, "Channel Estimation and Performance Analysis of One-Bit Massive MIMO Systems," IEEE Transactions on Signal Processing, vol. 65, no. 15, pp. 4075-4089, August 2017) because the channel estimator relies on the techniques developed in existing research (Y. Li, C. Tao, G. Seco-Granados, A. Mezghani, A. L. Swindlehurst and L. Liu, "Channel Estimation and Performance Analysis of One-Bit Massive MIMO Systems," IEEE Transactions on Signal Processing, vol. 65, no. 15, pp. 4075-4089, August 2017).

The Bussgang decomposition for one-bit quantizer may be obtained by Equation 8 below.

$$r = Q(y) = Ay + q$$
[Equation 8]

Herein, A denotes the linear operator and q denotes the statistically equivalent quantization noise.

The linear operator A may be obtained by Equation 9 below.

$$\begin{aligned} A &= \operatorname*{argmin}_{A \in C^{M_T \times M_T}} E\{\|r - Ay\|^2\} \\ &= \operatorname*{argmin}_{A \in C^{M_T \times M_T}} (C_r - C_{ry}A^H - AC_{yr} + AC_Y A^H) \\ &= \operatorname*{argmin}_{A \in C^{M_T \times M_T}} \Lambda(A) \end{aligned}$$
[Equation 9]

Herein, $C_{yr}$ denotes the cross-covariance matrix between the receive signal y and the quantized signal r, $C_r$ denotes the auto-covariance matrix of r, and $C_y$ denotes the auto-covariance matrix of y.

The derivative of $\Lambda(A)$ with respect to $A^H$ may be represented as Equation 10 below.

$$\frac{\partial \Lambda(A)}{\partial A^H} = -C_{yr}^H + AC_y = 0$$
$$A = C_{yr}^H C_y^{-1},$$
[Equation 10]

Herein, $C_{yr}$ may be represented as Equation 11 below.

$$C_{yr} = \sqrt{\frac{2}{\pi}}\, C_y \text{diag}(C_y)^{-\frac{1}{2}}$$
[Equation 11]

Thus, the matrix A may be represented as Equation 12 below.

$$A = C_{yr}^H C_y^{-1} \quad \text{[Equation 12]}$$

$$= \left(\sqrt{\frac{2}{\pi}} C_y \text{diag}(C_y)^{-1/2}\right)^H C_y^{-1}$$

$$= \sqrt{\frac{2}{\pi}} \text{diag}(C_y)^{-\frac{1}{2}}$$

$$= \sqrt{\frac{2}{\pi}} \text{diag}(\Phi R \Phi^H + I_{M_\tau})^{-\frac{1}{2}}$$

$$\overset{(a)}{=} \sqrt{\frac{2}{\pi}} \text{diag}(K\rho R + I_{M_\tau})^{-\frac{1}{2}}$$

Herein, (a) may be represented as the above because the diagonal terms of $\Phi \Phi^H$ are equal to $K\rho$.

Using Equations 5 and 8, r may be represented as Equation 13 below.

$$r = Q(y) = \tilde{\Phi}\underline{h} + \tilde{n} \quad \text{[Equation 13]}$$

Herein, $\tilde{\Phi} = A\Phi \in \mathbb{C}^{M_\tau \times M_\tau}$, $\tilde{n} = An + q \in \mathbb{C}^{M_\tau \times 1}$.

Based on the Bussgang decomposition, an embodiment of the inventive concept may construct a linear minimum mean square error (LMMSE) estimator, which is referred as a Bussgang LMMSE (BLMMSE) channel estimator. Such a BLMMSE channel estimator may be represented as Equation 14 below.

$$\hat{\underline{h}}^{BLM} = C_{hr} C_r^{-1} r = (C_{\underline{h}} \tilde{\Phi}^H + C_{hq}) C_r^{-1} r \quad \text{[Equation 14]}$$

Herein, $C_{hr}$ denotes the cross-covariance matrix between $\underline{h}$ and r.

The proof of Equation 14 may use the same approach to obtain A in Equation 10 above. $C_r$ may be given by the arcsin law and may be represented as Equation 15 below.

$$C_r = \frac{2}{\pi}\left(\arcsin\left(\sum_y^{-1/2} \text{Re}\{C_y\} \sum_y^{-1/2}\right) + j\arcsin\left(\sum_y^{-1/2} \text{Im}\{C_y\} \sum_y^{-1/2}\right)\right) \quad \text{[Equation 15]}$$

Herein, $$\sum_y = \text{diag}(C_y)^{-\frac{1}{2}}.$$

Since q is uncorrelated with $\underline{h}$, the BLMMSE channel estimator of Equation 14 above may be expressed as Equation 16 below.

$$\hat{\underline{h}}^{BLM} = C_{\underline{h}} \tilde{\Phi}^H C_r^{-1} r \quad \text{[Equation 16]}$$

An embodiment of the inventive concept may define the normalized mean squared error (NMSE) of the BLMMSE channel estimator as Equation 17 below.

$$M^{BLE} = \frac{1}{MK} E\left\{\left\|\hat{\underline{h}}^{BLE} - \underline{h}\right\|_2^2\right\} \quad \text{[Equation 17]}$$

$$= \frac{1}{MK} tr\left(C_{\underline{h}} - C_{\underline{h}}\tilde{\Phi}^H C_r^{-1} r\tilde{\Phi} C_{\underline{h}}^H\right)$$

Figure 2:
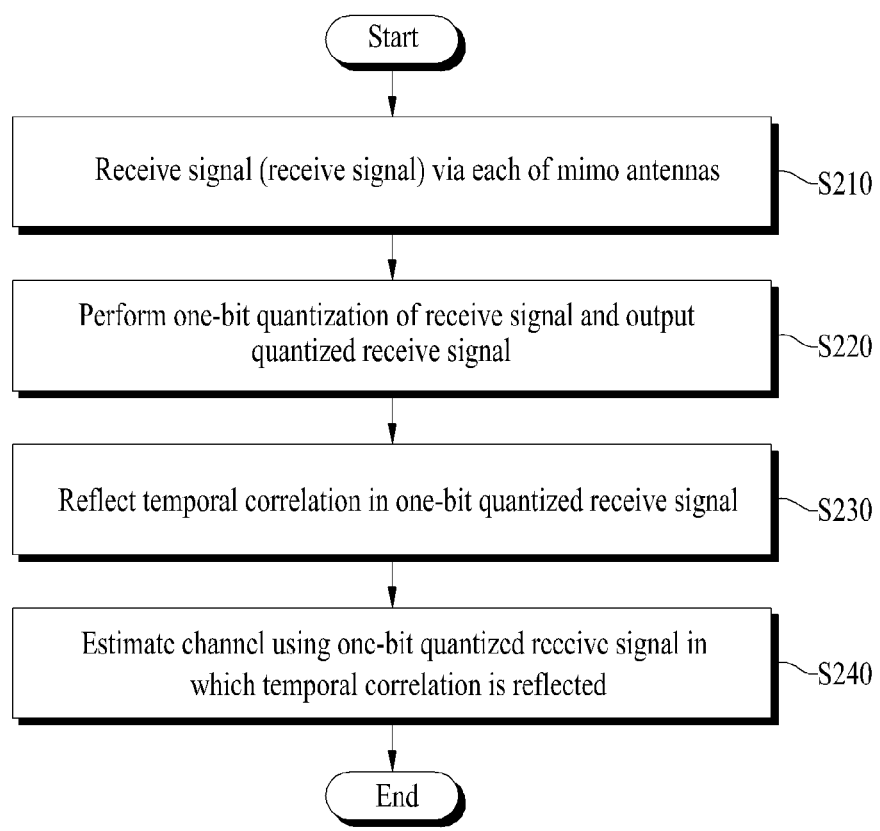
FIG. 2 is a flowchart illustrating an operation of a channel estimation method in a MIMO system according to an embodiment of the inventive concept.

FIG. 2 is a flowchart illustrating an operation of a channel estimation method in a MIMO system according to an embodiment of the inventive concept.

Referring to FIG. 2, in operation S210, the channel estimation method according to an embodiment of the inventive concept may receive a signal, that is, a receive signal, received at a MIMO system via each of MIMO antennas.

Herein, the receive signals received in operation S210 may be provided to one-bit ADCs through RF chains, respectively.

In operation S220, the channel estimation method may quantize the receive signals received in operation S210 using the one-bit ADCs and may output the one-bit quantized receive signals.

In operation S230, the channel estimation method may reflect a temporal correlation in the one-bit quantized receive signals output in operation S220. In operation S240, the channel estimation method may estimate a channel for the receive signal received via each of the MIMO antennas based on the receive signals in which the temporal correlation is reflected.

A description will be given in detail of such a technique according to an embodiment of the inventive concept.

Successive Channel Estimator According to an Embodiment of the Inventive Concept The successive channel estimation technique exploiting the temporal channel correlation according to an embodiment of the inventive concept may be based on the above-mentioned Bussgang decomposition and the Kalman filtering. To develop the channel estimator according to an embodiment of the inventive concept, the embodiment of the inventive concept may first reformulate the channel model in Equation 2 above using vectorized notations and may be represented as Equation 18 below.

$$\underline{h}_0 = R^{\frac{1}{2}} \underline{g}_0, \quad \text{[Equation 18]}$$

$$\underline{h}_i = \eta \underline{h}_{i-1} + \xi R^{\frac{1}{2}} \underline{g}_i, \, i \geq 1$$

Herein, $\underline{g}_i$ denotes the vectorized version of the innovation process, which is represented as Equation 19 below.

$$\underline{g}_i = \text{vec}(g_{i,1}, g_{i,2}, K, g_{i,K}) i \geq 0 \quad \text{[Equation 19]}$$

Note that the temporal correlation matrices $\eta$ and $\xi$ in Equation 18 above may be given by Equation 20 below.

$$=\eta = \{\text{diag}(\eta_1, \eta_2, K, \eta_K) \otimes I_M\},$$

$$\xi = \{\text{diag}(\xi_1, \xi_2, K, \xi_K) \otimes I_M\} \quad \text{[Equation 20]}$$

Herein, $\eta_k$ denotes the temporal correlation coefficient of a k-th user and $\xi_k = \sqrt{1-\eta_k^2}$.

In this case, the quantized signal may be represented as Equation 21 below by the technique described in the single-shot estimator.

$$r_i = Q(y_i) \quad \text{[Equation 21]}$$

The received signal with the Bussgang decomposition may be represented as Equation 22 below.

$$r_i = Q(y_i) = A_i y_i + q_i \quad \text{[Equation 22]}$$

Herein, $A_i$ denotes the linear operator and $q_i$ denotes the statistically equivalent quantization noise. Thus, the receive signal may be represented as Equation 23 below.

$$r_i = \tilde{\Phi}_i \underline{h}_i + \tilde{n}_i \quad \text{[Equation 23]}$$

Herein, $\tilde{\Phi}_i = A_i \bar{\Phi}_i \in C^{M\tau \times M\tau}$, $\tilde{n} = A_i n_i + q_i \in C^{M\tau \times 1}$.

The Kalman filter may work when the noise is the Gaussian distribution. However, the effective noise $\tilde{n}_i$ is not Gaussian. To overcome this issue, an embodiment of the inventive concept may replace $\tilde{n}_i$ with $\check{n}_i$. Herein, $\check{n}_i$ may follow the Gaussian distribution with zero mean and the covariance matrix $C_{\tilde{n}_i}$, which denotes the covariance matrix of the effective noise $\tilde{n}_i$.

An embodiment of the inventive concept may define a new receive signal $\check{r}_i$. The defined receive signal $\check{r}_i$ may be represented as Equation 24 below.

$$\check{r}_i = \tilde{\Phi}_i \underline{h}_i + \check{n}_i \quad \text{[Equation 24]}$$

Herein, $\check{n}_i \sim CN(0_{M\tau}, C_{\tilde{n}_i})$

The channel estimation based on the Kalman filter may be summarized in Algorithm 1.

---

Algorithm 1 Channel Estimation Based on Kalman Filter

1: Initialization:

$\hat{\underline{h}}_{0|-1} = 0_{MK}$, $M_{0|-1} = \underline{R} = E\{\underline{h}_0 \underline{h}_0^H\}$ 2: Prediction:

$\hat{\underline{h}}_{i|i-1} = \eta \hat{\underline{h}}_{i-1|i-1}$

3: Minimum prediction MSE matrix (MK × MK):

$M_{i|i-1} = \underline{\eta} M_{i-1|i-1} \underline{\eta}^H + \xi \underline{R} \underline{\xi}^H$ 4: Kalman gain matrix (MK × M$\tau$):

$K_i = M_{i|i-1} \tilde{\Phi}_i^H (C_{\tilde{n}} + \tilde{\Phi}_i M_{i|i-1} \tilde{\Phi}_i^H)^{-1}$ 5: Correction $\hat{\underline{h}}_{i|i} = \hat{\underline{h}}_{i|i-1} + K_i(r_i - \tilde{\Phi}_i \hat{\underline{h}}_{i|i-1})$ 6: Minimum MSE matrix (MK × MK):

$M_{i|i} = (I_{MK} - K_i \tilde{\Phi}_i) M_{i|i-1}$

---

Algorithm 1 may be divided into a prediction portion (processes 2 and 3 of algorithm 1) and a correction portion (processes 4 to 6 of algorithm 1). In the prediction portion, the state $\hat{\underline{h}}_{i|i-1}$ and the estimation error covariance matrix $M_{i|i-1}$ of a next measurement time may be predicted using a current state and model (processes 2 and 3 of algorithm 1). In the correction portion, the Kalman gain matrix $K_i$ may be obtained using the estimation error covariance matrix $M_{i|i-1}$ obtained in the prediction portion and the noise covariance matrix $C_{\tilde{n}_i}$ (Process 4 of Algorithm 1). The corrected value $\hat{\underline{h}}_{i|i}$ may be calculated by adding a value obtained by multiplying the Kalman gain matrix $K_i$ by a difference between the really measured value $r_i$ and the predicted measurement state value $\tilde{\Phi}_i \hat{\underline{h}}_{i|i-1}$ to the previously predicted value $\hat{\underline{h}}_{i|i-1}$ (process 5 of algorithm 1). Finally, the value of the error covariance matrix $M_{i|i-1}$ may be updated (process 6 of algorithm 1). Moreover, before the prediction portion and the correction portion start, the initial value $\hat{\underline{h}}_{0|-1}$ should be set (process 1 of algorithm 1). Sequentially repeating the prediction portion and the correction portion may be the Kalman filter (Algorithm 1).

Note that in Algorithm 1, $\underline{R}$ in Step 1 is defined in Equation 6 above, $r_i$ in Step 5 is the quantized signal in Equation 21 above, not the approximated $\check{r}_i$ in Equation 24 above.

Numerical Result

An embodiment of the inventive concept may perform Monte-Carlo simulation to verify the channel estimation algorithm according to the embodiment of the inventive concept. An embodiment of the inventive concept may use the NMSE as the performance metric. Herein, the NMSE may be represented as Equation 25 below.

$$NMSE = \frac{1}{MK} E\left\{\left\|\hat{\underline{h}} - \underline{h}\right\|_2^2\right\} \quad \text{[Equation 25]}$$

Herein, $\hat{\underline{h}}$ denotes the estimated channel.

An embodiment of the inventive concept may define the pilot sequence $\Phi$ from the discrete Fourier transform (DFT) matrix and may choose K columns of the $\tau \times \tau$ DFT matrix to obtain the pilot sequence. An embodiment of the inventive concept may adopt the exponential model for the spatial correlation matrix $R_k$. The spatial correlation matrix $R_k$ may be represented as Equation 26 below.

$$R_k = \begin{bmatrix} 1 & r_k & \Lambda & r_k^{M-1} \\ r_k^* & 1 & \Lambda & M \\ M & M & O & M \\ r_k^{*(M-1)} & \Lambda & \Lambda & 1 \end{bmatrix} \quad \text{[Equation 26]}$$

Herein, $r_k = r\, e^{\theta_k}$ ($0 < r < 1$, $0 < \theta_k < 2$).

In this case, since all diagonal entries of $\underline{R}$ are 1, the matrix A in Equation 12 above may be simplified as Equation 27 below.

$$A = \sqrt{\frac{2}{\pi} \frac{1}{K\rho + 1}} I_{M\tau} \quad \text{[Equation 27]}$$

For the temporal correlation, an embodiment of the inventive concept may adopt Jakes' model, which is defined as $\eta k = J_0(2\pi f_D \tau)$ where $J_0(\cdot)$ is the 0-th order Bessel function, $f_D = v f_c/c$ is the Doppler frequency with the user speed v, the carrier frequency fc, and the speed of light c, and t is the channel instantiation interval.

Figure 3:
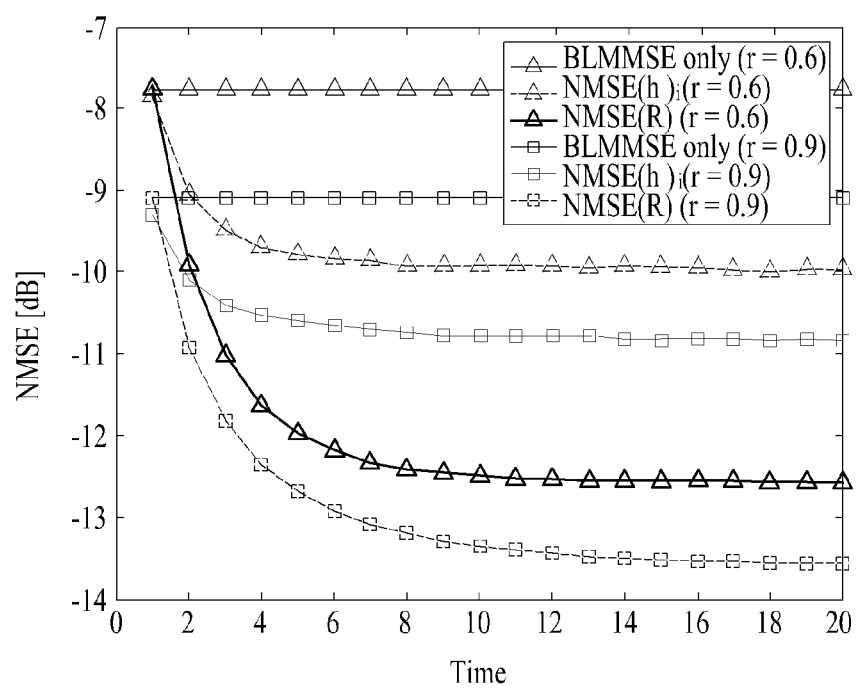
FIG. 3 is a drawing illustrating a performance comparison according to a time slot with different values of a spatial correlation coefficient.

FIG. 3 is a drawing illustrating a performance comparison according to a time slot with different values of a spatial correlation coefficient and illustrating an NMSE comparison over time for magnitude of the spatial correlation coefficient r=0.6 or 0.9 when SNR=0.

In FIG. 3, an embodiment of the inventive concept may set the number of BS antennas M=16, the number of users K=4, and the number of training symbols $\tau$=20. The temporal correlation coefficient is $\eta_k$=0.9881, and the SNR is SNR=0. NMSE($h_i$) denotes the NMSE performance of the technique according to an embodiment of the inventive concept. NMSE(R) denotes the NMSE performance of the Kalman filter with the Gaussian noise, not the true quantization noise. The BLMMSE only denotes the NMSE performance by the technique proposed in existing research (Y. Li, C. Tao, G. Seco-Granados, A. Mezghani, A. L. Swindlehurst and L. Liu, "Channel Estimation and Performance Analysis of One-Bit Massive MIMO Systems," IEEE Transactions on Signal Processing, vol. 65, no. 15, pp. 4075-4089, August 2017). Herein, the BLMMSE only denotes the NMSE performance of the single-shot channel estimation.

As seen with reference to FIG. 3, the NMSE of the channel estimator according to an embodiment of the inventive concept may outperform the NMSE of the BLMMSE only with the time slot. The estimation performance technique according to an embodiment of the inventive concept may become better when channels are more spatially correlated.

Figure 4:
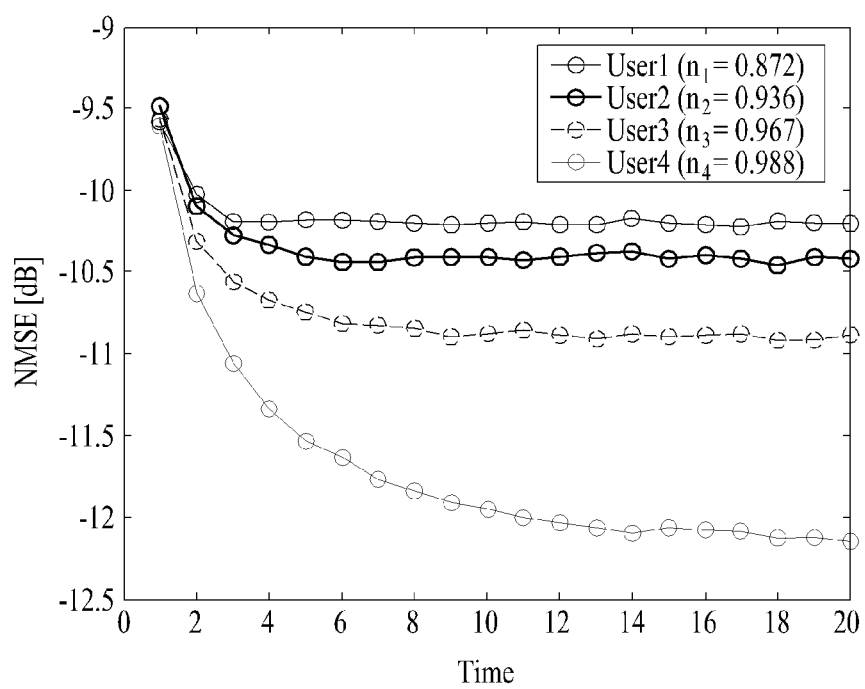
FIG. 4 is a drawing illustrating a performance comparison according to a time slot with user-dependent temporal correlations.

FIG. 4 is a drawing illustrating a performance comparison according to a time slot with user-dependent temporal correlations and illustrating an NMSE comparison over time when the temporal correlation coefficients $\eta_k$ are 0.872, 0.936, 0.967, and 0.988 for each user. Herein, the temporal correlation coefficients 0.872, 0.936. 0.967, and 0.988 may correspond to $\upsilon_k$=10 km/h, 7 km/h, 5 km/h, and 3 km/h, respectively.

In FIG. 4, an embodiment of the inventive concept may set the number of BS antennas M=16, the number of users K=4, and the number of training symbols $\tau$=20, and the magnitude of the spatial correlation coefficient r=0.9. As seen with reference to FIG. 4, the channel estimation technique according to an embodiment of the inventive concept may work for the user-dependent temporal fading as well while the users experiencing more temporal correlation benefit more from the technique according to the embodiment of the inventive concept.

Figure 5:
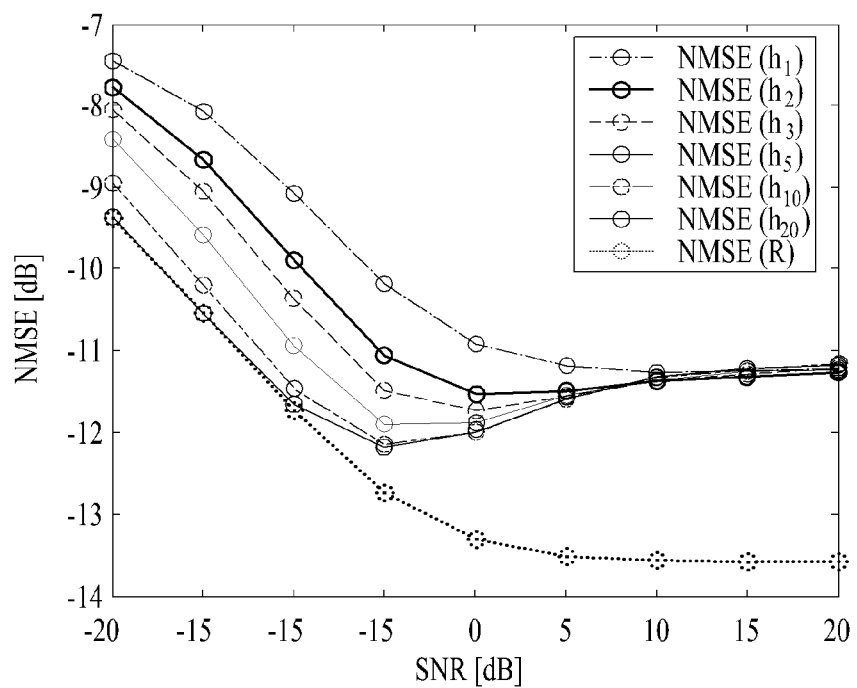
FIG. 5 is a drawing illustrating a performance comparison according to an SNR with different values of a time slot.

FIG. 5 is a drawing illustrating a performance comparison according to an SNR with different values of a time slot and illustrating an NMSE comparison according to the SNR when the number of BS antennas M=16, the number of users K=4, the number of training symbols $\tau$=20, the temporal correlation coefficient $\eta_k$=0.9881, and the spatial correlation coefficient r=0.6.

As seen with reference to FIG. 5, the technique according to an embodiment of the inventive concept may have low NMSE with larger time slot index i. In a high SNR, NMSE(R) may be lower than NMSE($h_i$) about 4 dB. In a low SNR, NMSE($h_i$) may be almost similar to NMSE(R) after 10 successive estimations.

Herein, that NMSE(R) is lower than NMSE($h_i$) about 4 dB for the high SNR may be that the one-bit ADC quantizer has almost 4 dB loss with respect to NMSE(R) where the loss comes from the Gaussian model mismatch.

As such, the channel estimation method according to an embodiment of the inventive concept may reflect the spatial and temporal correlations and may enhance estimation accuracy for channel estimation by performing Bussgang decomposition of the receive signal in which one-bit quantization is performed, replacing the non-linear function to the statistically equivalent linear function, and replacing the quantization noise to the statistically equivalent Gaussian noise using the Kalman filter.

Furthermore, when the entire noise is close to the Gaussian distribution since the influence of the quantization noise in a low SNR is relatively more reduced than the entire noise, since it is suitable for the Kalman filter, the channel estimation method according to an embodiment of the inventive concept may more increase estimation accuracy for channel estimation.

Moreover, in the channel estimation method according to an embodiment of the inventive concept, a normalized mean square error (NMSE) may be decreased as the time slot increases. As the spatial and temporal correlation coefficients are large, it is possible to estimate the channels more accurately.

An embodiment is exemplified as ADCs are limited to one-bit ADCs in the method according to an embodiment of the inventive concept. However, embodiments are not limited thereto. For example, the method according to an embodiment of the inventive concept may reflect the temporal correlation and the spatial correlation in quantization for the levels of the receive signals using low resolution ADCs and may estimate channels of receive signals received via MIMO antennas.

Figure 6:
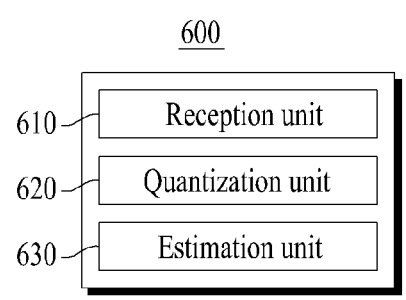
FIG. 6 is a block diagram illustrating a channel estimation apparatus in a MIMO system according to an embodiment of the inventive concept.

FIG. 6 is a block diagram illustrating a channel estimation apparatus in a massive MIMO system according to an embodiment of the inventive concept and illustrating a configuration of an apparatus for performing details associated with the above-mentioned method of FIGS. 2 to 5.

Referring to FIG. 6, an apparatus 600 according to an embodiment of the inventive concept may include a reception unit 610, a quantization unit 620, and an estimation unit 630. Herein, the reception unit 610, the quantization unit 620, and the estimation unit 630 may correspond to MIMO antennas 110, ADCs 130, and a baseband processing unit 140 shown in FIG. 1, respectively.

The reception unit 610 may receive signals received from users via MIMO antennas. In other words, the reception unit 610 may receive wireless signals using the MIMO antennas and may output the received wireless signals (receive signals) to the quantization unit 620 via RF chains.

The quantization unit 620 may quantize the receive signals output via the reception unit 610 using ADCs.

Herein, the quantization unit 620 may perform one-bit quantization of the receive signals using one-bit ADCs. Of course, the quantization unit 620 may quantize the receive signals using low resolution ADCs.

The estimation unit 630 may reflect a temporal correlation in the quantized receive signals output via the quantization unit 620 and may estimate channels for the receive signals received via the MIMO antennas based on the receive signals in which the temporal correlation is reflected.

Herein, the estimation unit 630 may additionally reflect a spatial correlation in the quantized receive signals and may estimate the channels for the receive signals received via the MIMO antennas based on the receive signals in which the spatial correction and the temporal correlation are reflected.

In detail, the estimation unit 630 may estimate the channels for the receive signals received via the MIMO antennas by performing Bussgang decomposition of the quantized receive signals and performing Kalman filtering of the receive signals in which the Bussgang decomposition is performed.

Herein, the estimation unit 630 may perform the Bussgang decomposition of the quantized received signals, may replace a non-linear function included in the quantized receive signals to a linear function, may replace noise, included in the receive signals in which the Bussgang decomposition is performed, to Gaussian noise to perform the Kalman filtering of the receive signals in which the Bussgang decomposition is performed.

Although the description is omitted in the channel estimation apparatus of FIG. 6, it is obvious to those skilled in the art that the channel estimation apparatus may include all details described with reference to FIGS. 2 to 5.

The foregoing systems or devices may be realized by hardware components, software components, and/or combinations thereof. For example, the systems, devices, and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to embodiments may be implemented with program instructions which may be executed through various computer means and may be recorded in computer-readable media. The media may also include, alone or in combination with the program instructions, data files, data structures, and the like. The program instructions recorded in the media may be designed and configured specially for an embodiments or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of embodiments, or vice versa.

According to embodiments of the inventive concept, the apparatus may enhance estimation accuracy for uplink channel estimation using a temporal correlation in a MIMO system which performs one-bit quantization.

In detail, according to embodiments of the inventive concept, the apparatus may reflect the spatial and temporal correlations and may enhance estimation accuracy for channel estimation by performing Bussgang decomposition of a receive signal in which one-bit quantization is performed, replacing the non-linear function to the statistically equivalent linear function, and replacing the quantization noise to the statistically equivalent Gaussian noise to use the Kalman filter.

According to embodiments of the inventive concept, when the entire noise is close to the Gaussian distribution since the influence of the quantized noise is more reduced in a low SNR than the entire noise, since it is suitable for the Kalman filter, the apparatus may more increase estimation accuracy for channel estimation.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. A channel estimation method, the method comprising:
   quantizing a receive signal received via each of multiple-input multiple-output (MIMO) antennas using an analog-to-digital converter (ADC); and
   reflecting a temporal correlation in the quantized receive signal and estimating a channel for the receive signal, received via each of the MIMO antennas, based on the receive signal in which the temporal correlation is reflected,
   wherein the estimating comprises:
   estimating the channel for the receive signal received via each of the MIMO antennas by performing Bussgang decomposition of the quantized receive signal and performing Kalman filtering of the receive signal in which the Bussgang decomposition is performed; and
   replacing noise, included in the receive signal in which the Bussgang decomposition is performed, to Gaussian noise to perform the Kalman filtering of the receive signal in which the Bussgang decomposition is performed.

2. The method of claim 1, wherein the estimating comprises:
   additionally reflecting a spatial correlation in the quantized receive signal; and
   estimating the channel for the receive signal, received via each of the MIMO antennas, based on the receive signal in which the spatial correlation and the temporal correlation are reflected.

3. The method of claim 1, wherein the estimating comprises:
   performing the Bussgang decomposition of the quantized receive signal; and
   replacing a non-linear function included in the quantized receive signal to a linear function.

4. The method of claim 1, wherein the quantizing comprises:
   performing one-bit quantization of the receive signal using a one-bit ADC.

5. A channel estimation apparatus, the apparatus comprising:
   a quantization unit configured to quantize a receive signal received via each of multiple-input multiple-output (MIMO) antennas using an ADC; and
   an estimation unit configured to reflect a temporal correlation in the quantized receive signal and estimate a channel for the receive signal, received via each of the MIMO antennas, based on the receive signal in which the temporal correlation is reflected,
   wherein the estimation unit is configured to:

estimate the channel for the receive signal received via each of the MIMO antennas by performing Bussgang decomposition of the quantized receive signal and performing Kalman filtering of the receive signal in which the Bussgang decomposition is performed; and replace noise, included in the receive signal in which the Bussgang decomposition is performed, to Gaussian noise to perform the Kalman filtering of the receive signal in which the Bussgang decomposition is performed.

6. The apparatus of claim 5, wherein the estimation unit is configured to:

additionally reflect a spatial correlation in the quantized receive signal; and estimate the channel for the receive signal, received via each of the MIMO antennas, based on the receive signal in which the spatial correlation and the temporal correlation are reflected.

7. The apparatus of claim 5, wherein the estimation unit is configured to:

perform the Bussgang decomposition of the quantized receive signal; and replace a non-linear function included in the quantized receive signal to a linear function.

8. The apparatus of claim 5, wherein the quantization unit is configured to:

perform one-bit quantization of the receive signal using a one-bit ADC.

* * * * *